US007096028B2

(12) United States Patent
Taketsugu

(10) Patent No.: US 7,096,028 B2
(45) Date of Patent: Aug. 22, 2006

(54) MOBILE COMMUNICATION SYSTEM

(75) Inventor: Masanori Taketsugu, Tokyo (JP)

(73) Assignee: NEC Corporation, Tokyo (JP)

( * ) Notice: Subject to any disclaimer, the term of this patent is extended or adjusted under 35 U.S.C. 154(b) by 566 days.

(21) Appl. No.: 10/083,302

(22) Filed: Feb. 27, 2002

(65) Prior Publication Data

US 2002/0119755 A1  Aug. 29, 2002

(30) Foreign Application Priority Data

Feb. 28, 2001  (JP) .............................. 2001-053814

(51) Int. Cl.
 *H04M 1/00* (2006.01)
(52) U.S. Cl. ................. 455/452.2; 455/450; 455/452.1; 455/67.11; 455/67.13; 455/561; 455/226.1; 370/465; 370/468; 370/335; 370/342
(58) Field of Classification Search ........ 455/450–451, 455/452.1, 67.11–16, 561, 226.1–2, 176.1, 455/177.1, 179.1, 180.1, 452.2, 68–71, 418–420, 455/423–425, 507, 509–513, 562.1; 370/329, 370/332, 335, 342, 330–331, 333, 465, 235, 370/229–230, 252
See application file for complete search history.

(56) References Cited

U.S. PATENT DOCUMENTS

| | | | | |
|---|---|---|---|---|
| 5,132,966 A | * | 7/1992 | Hayano et al. ............. | 370/233 |
| 5,432,790 A | * | 7/1995 | Hluchyj et al. ............. | 370/412 |
| 5,740,537 A | * | 4/1998 | Beming et al. ............. | 455/450 |
| 5,826,169 A | * | 10/1998 | Natarajan ................... | 455/13.1 |
| 5,832,378 A | * | 11/1998 | Zicker et al. ............ | 455/552.1 |
| 5,857,147 A | | 1/1999 | Gardner et al. | |
| 5,982,748 A | * | 11/1999 | Yin et al. ................... | 370/232 |
| 6,069,883 A | * | 5/2000 | Ejzak et al. ................ | 370/335 |
| 6,181,684 B1 | * | 1/2001 | Turcotte et al. ............. | 370/332 |
| 6,222,824 B1 | * | 4/2001 | Marin et al. ................. | 370/230 |
| 6,373,855 B1 | * | 4/2002 | Downing et al. ........... | 370/468 |
| 6,377,548 B1 | * | 4/2002 | Chuah ........................ | 370/233 |
| 6,459,681 B1 | * | 10/2002 | Oliva ........................ | 370/232 |
| 6,560,231 B1 | * | 5/2003 | Kawakami et al. .... | 370/395.43 |

(Continued)

FOREIGN PATENT DOCUMENTS

EP    0 946 008 A2    9/1999

(Continued)

OTHER PUBLICATIONS

W. Chen et al., "RSVP Mobility Support: A Signaling Protocol for Integrated Services Internet with Mobile Hosts", Infocom 2000, Nineteenth Annual Joint Conference of the IEEE Computer and Communications Societies, Mar. 26, 2000, pp. 1283-1292.

(Continued)

*Primary Examiner*—Matthew Anderson
*Assistant Examiner*—Tuan Tran
(74) *Attorney, Agent, or Firm*—Sughrue Mion, PLLC

(57) ABSTRACT

In a mobile communication system, a mobile terminal can designate a communication quality in requesting communication. A radio base station is connected to the mobile terminal through a radio channel. A radio network controller is connected to the radio base station to control the communication quality between the mobile terminal and the radio base station. The radio network controller includes a communication request reception determination unit. Upon receiving a communication request which designates the communication quality from the mobile terminal, the communication request reception determination unit determines whether the received communication request is to be received, on the basis of a communication quality provided to communication which requests without communication quality.

5 Claims, 4 Drawing Sheets

U.S. PATENT DOCUMENTS

| | | | |
|---|---|---|---|
| 6,631,269 B1 * | 10/2003 | Cave | 455/450 |
| 6,647,265 B1 * | 11/2003 | Olofsson et al. | 455/445 |
| 2001/0004599 A1 * | 6/2001 | Dokko | 455/452 |
| 2003/0003960 A1 * | 1/2003 | Shoji et al. | 455/561 |
| 2003/0198205 A1 * | 10/2003 | Uebayashi et al. | 370/335 |
| 2004/0033807 A1 * | 2/2004 | Cave | 455/450 |

FOREIGN PATENT DOCUMENTS

| | | |
|---|---|---|
| EP | 1 059 792 A2 | 12/2000 |
| JP | 10-108260 | 2/1998 |
| JP | H10-108260 A | 4/1998 |
| JP | 11-69431 | 3/1999 |
| JP | H11-69-431 A | 3/1999 |
| JP | 2000-78146 | 3/2000 |
| JP | 2000-78146 A | 3/2000 |
| JP | 2000-91985 A | 3/2000 |
| JP | 2000-165927 A | 6/2000 |
| WO | WO 96/10305 A2 | 4/1996 |

OTHER PUBLICATIONS

K. Nichols et al., "Definition of the Differentiated Services Field (DS Field) in the Ipv4 and Ipv6 Headers", IETF RFC2474, Dec. 1998.

R. Ed et al., "Resource ReSerVation Protocol (RSVP) Version 1 Function Specification", IETF RFC2205, Sep. 1997.

\* cited by examiner

MOBILE COMMUNICATION SYSTEM

BACKGROUND OF THE INVENTION

The present invention relates to a mobile communication system having a radio network controller for controlling the communication quality between a mobile terminal and a radio base station.

Along with popularization of the Internet, the number of users who access the Internet using mobile terminals is increasing. Conventionally, for a fixed network, Diffserv for priority control (K. Nichols, et al., "Definition of the Differentiated Services Field (DS Field) in the IPv4 and IPv6 Headers", IETF RFC2474, December 1998) or RSVP for bandwidth reservation (R. Ed, et al., "Resource ReSerVation Protocol (RSVP) Version 1 Functional Specification", IETF RFC2205, September 1997) has been examined to satisfy the communication quality requested by users.

In a mobile communication system, however, the communication quality requested by users cannot be satisfied only by priority control or bandwidth reservation. The communication quality in a mobile communication system largely depends on the error rate in a radio zone. As a method of reducing the error rate in the radio zone, retransmission control or an error correcting code is used. When retransmission control or an error correcting code is used, a necessary bandwidth widens. When the necessary bandwidth is ensured as a predetermined width in the communication bandwidth of a radio channel, the utilization efficiency of the radio channel cannot be improved.

SUMMARY OF THE INVENTION

It is an object of the present invention to provide a mobile communication system capable of improving the utilization efficiency of a radio channel.

In order to achieve the above object, according to the present invention, there is provided a mobile communication system comprising a mobile terminal capable of designating a communication quality in requesting communication, a radio base station connected to the mobile terminal through a radio channel, and a radio network controller connected to the radio base station to control the communication quality between the mobile terminal and the radio base station, wherein the radio network controller comprises a communication request reception determination unit for, upon receiving a communication request which designates the communication quality from the mobile terminal, determining whether the received communication request is to be received, on the basis of a communication quality provided to communication which requests without communication quality.

DESCRIPTION OF THE PREFERRED EMBODIMENT

The present invention will be described below in detail with reference to the accompanying drawings.

Figure 1:
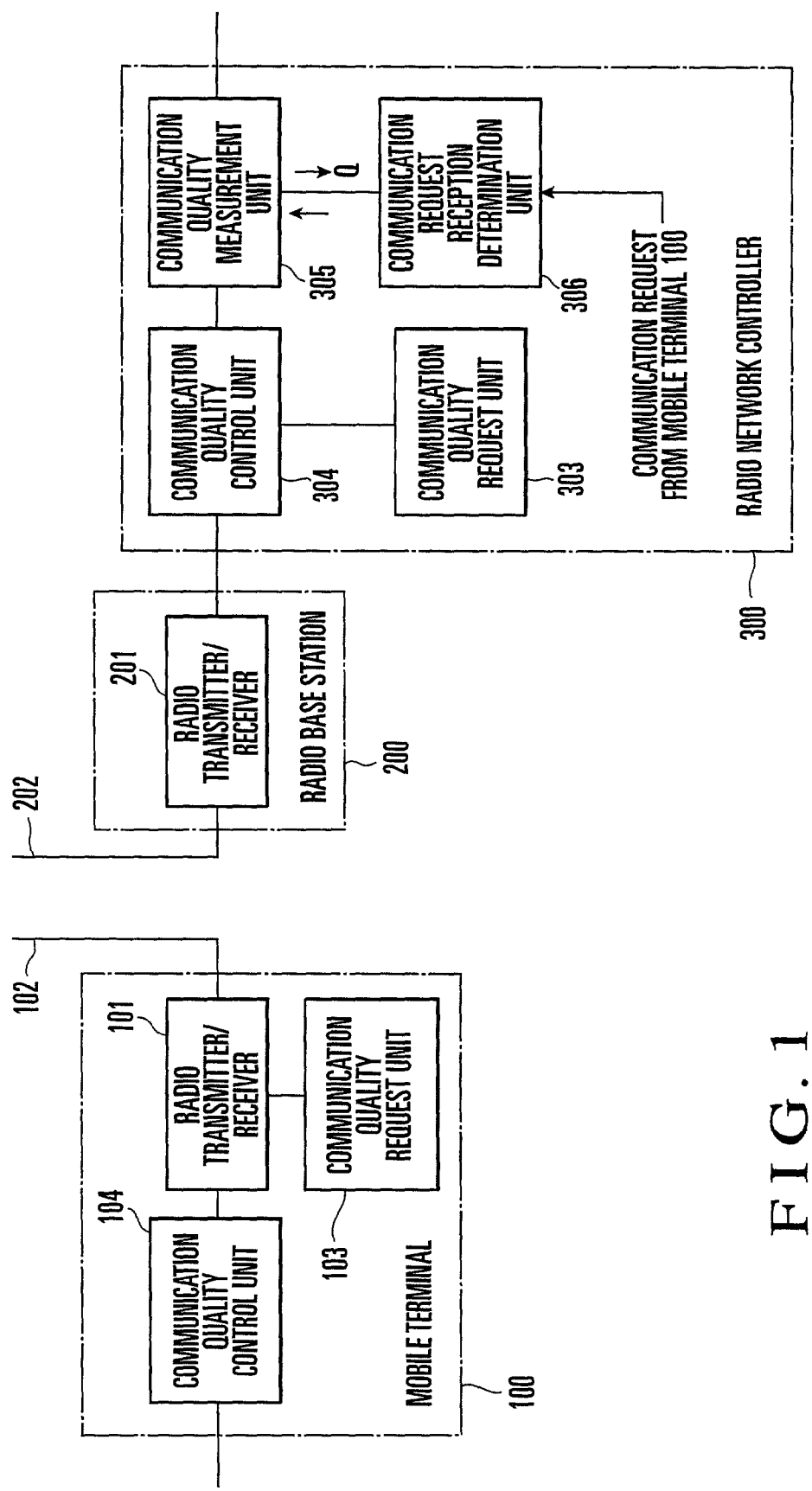
FIG. 1 is a block diagram of a mobile communication system according to an embodiment of the present invention.

FIG. 1 shows the system configuration of a mobile communication system according to an embodiment of the present invention. Referring to FIG. 1, reference numeral 100 denotes a mobile terminal; 200, a radio base station connected to the mobile terminal 100 through a radio channel; and 300, a radio network controller connected to the radio base station to control the communication quality between the mobile terminal 100 and the radio base station 200.

The mobile terminal 100 has a radio transmitter/receiver 101 for transmitting/receiving a radio signal through an antenna 102, a communication quality request unit 103 for requesting a communication quality of the radio base station 200 in requesting communication, and a communication quality control unit 104 for controlling the communication quality in accordance with that requested by the radio network controller 300. The radio base station 200 has a radio transmitter/receiver 201 for transmitting/receiving a radio signal to/from the mobile terminal 100 through an antenna 202. The radio network controller 300 has a communication quality request unit 303 for requesting a communication quality of the mobile terminal 100, a communication quality control unit 304 for controlling the communication quality in accordance with that requested by the mobile terminal 100, a communication quality measurement unit 305 for measuring the communication quality of communication which requests without communication quality, and a communication request reception determination unit 306 for determining on the basis of the measurement result from the communication quality measurement unit 305 whether a communication request is to be received.

Figure 5:
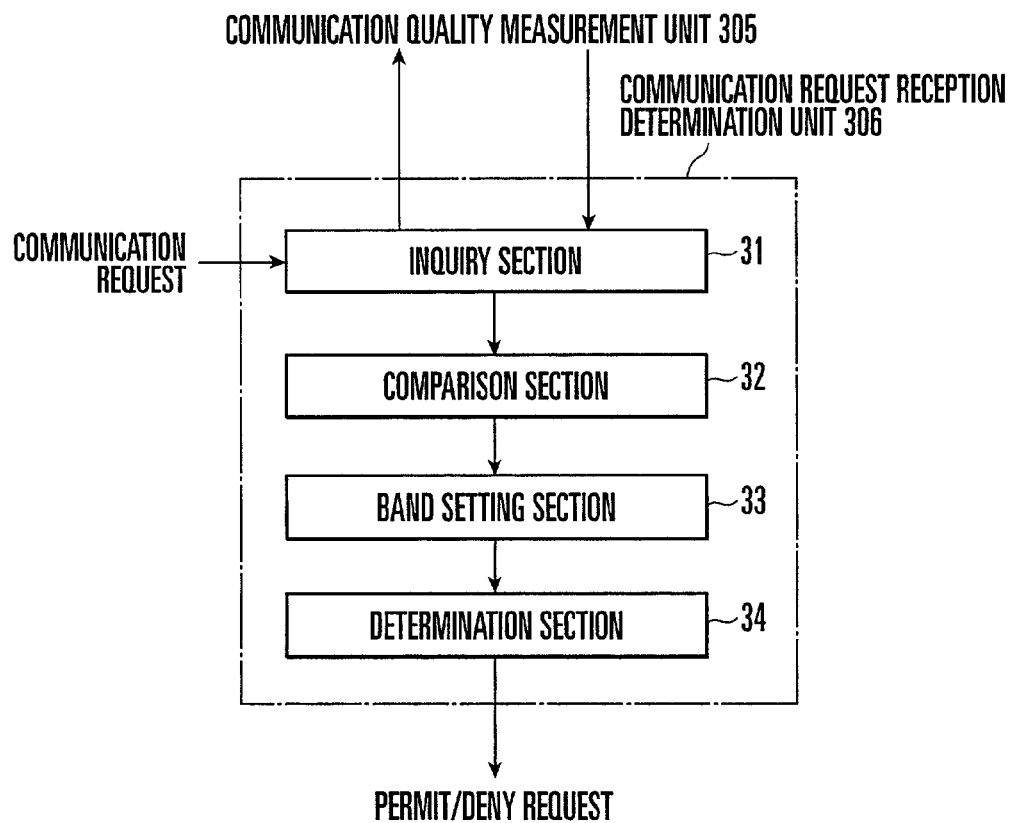
FIG. 5 is a block diagram of the communication request reception determination unit shown in FIG. 1.

As shown in FIG. 5, the communication request reception determination unit 306 has an inquiry section 31 for, upon receiving a communication request, inquiring of the communication quality measurement unit 305 about a communication quality Q provided to communication which requests without communication quality, a comparison section 32 for comparing the communication quality Q output from the communication quality measurement unit 305 in response to the inquiry with first and second threshold values QH and QL, a bandwidth setting section 33 for re-setting an allowable communication bandwidth on the basis of the comparison result from the comparison section, and a determination section 34 for determining whether the communication request is to be received, on the basis of the bandwidth required by the received communication request and the allowable communication bandwidth re-set by the bandwidth setting section 33.

Figure 2:
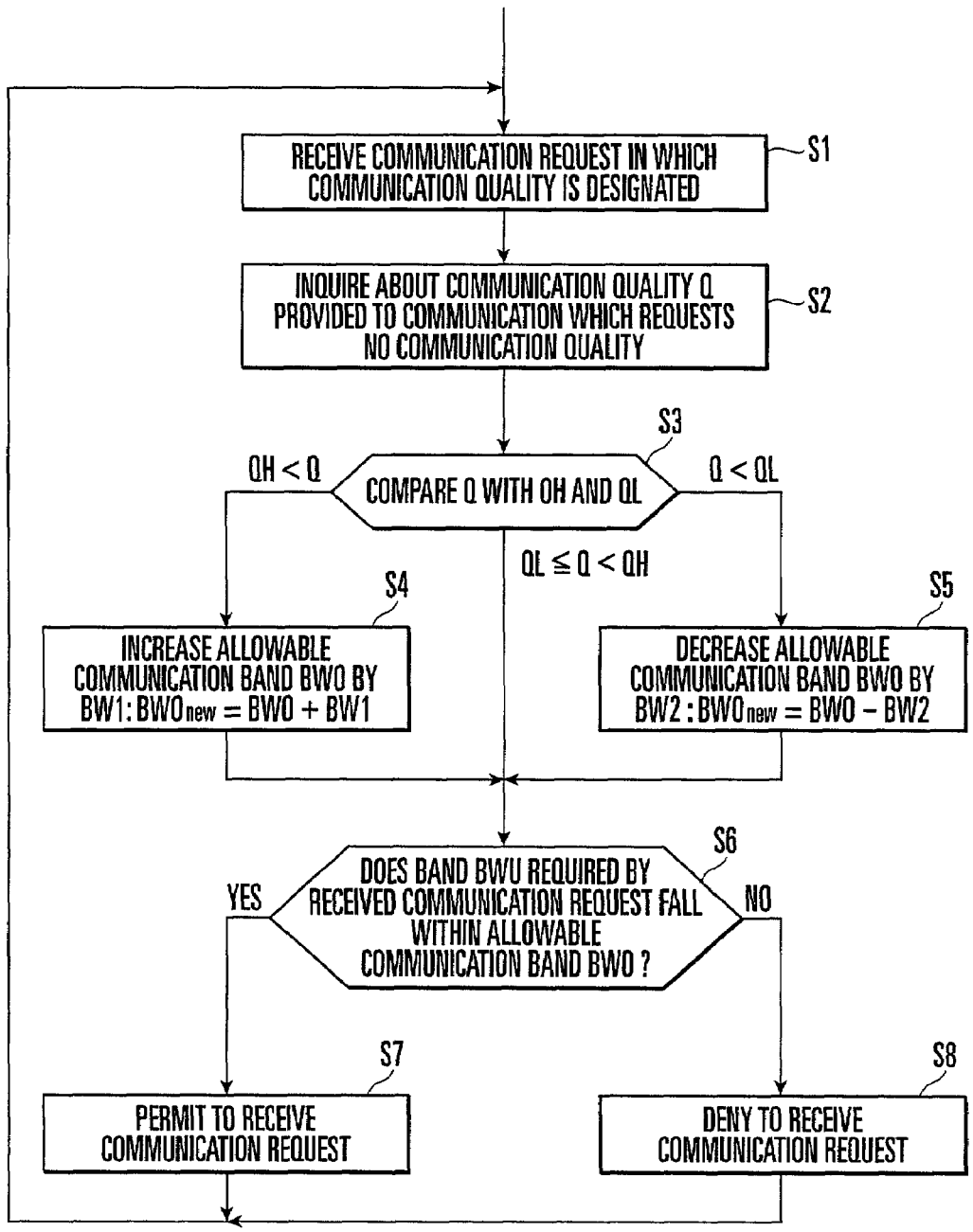
FIG. 2 is a flow chart showing the processing operation of a communication request reception determination unit in a radio network controller shown in FIG. 1.

The operation of the communication request reception determination unit 306 in the radio network controller 300 will be described next with reference to FIG. 2.

Upon receiving from the mobile terminal 100 (or a device externally connected to the mobile terminal 100) a communication request which designates a communication quality to be provided (step S1), the inquiry section 31 in the communication request reception determination unit 306 inquires of the communication quality measurement unit 305 about the communication quality Q provided to communication which requests without communication quality (step S2). In response to the inquiry, the communication quality measurement unit 305 measures the communication quality Q of communication which requests without communication quality and outputs the communication quality Q to the communication request reception determination unit 306.

The comparison section 32 compares the measured communication quality Q output from the communication quality measurement unit 305 with the first and second threshold values QH and QL(QL<QH) (step S3). As a result of comparison, if the measured communication quality Q is higher than the first threshold value QH(QH<Q), the bandwidth setting section 33 increases a current allowable communication bandwidth BW0 by a predetermined value BW1 to set a new allowable communication bandwidth BW0 (=$BW0_{new}$) (step S4). If the measured communication quality Q is lower than the second threshold value QL(Q<QL), the bandwidth setting section 33 decreases the current allowable communication bandwidth BW0 by a predetermined value BW2 to set the new allowable communication bandwidth BW0(=$BW0_{new}$) (step S5). If the measured communication quality Q is between the first threshold value QH and the second threshold value QL(QL≦Q≦QH), the current allowable communication bandwidth BW0 is maintained, i.e., neither increased nor decreased.

Figure 3:
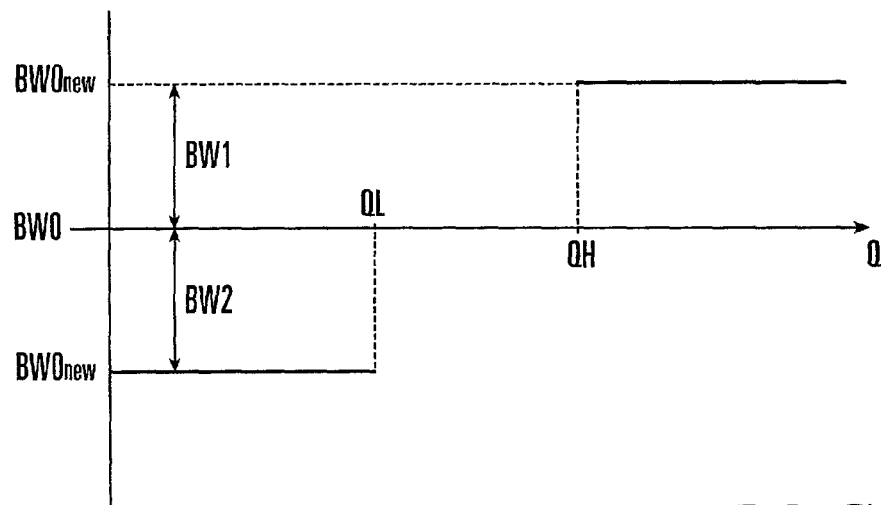
FIG. 3 is a view showing the setting situation of an allowable communication bandwidth BW0 in the communication request reception determination operation shown in FIG. 2.

FIG. 3 shows the setting situation of the allowable communication bandwidth BW0. The abscissa represents the communication quality Q, and the ordinate represents the allowable communication bandwidth BW0. As shown in FIG. 3, when QL≦Q≦QH, the current allowable communication bandwidth BW0 is kept unchanged. If QH<Q, the value (BW0+BW1) obtained by adding the predetermined value BW1 to the current allowable communication bandwidth BW0 is set as the new allowable communication bandwidth $BW0_{new}$. If Q<QL, the value (BW0–BW2) obtained by subtracting the predetermined value BW2 from the current allowable communication bandwidth BW0 is set as the new allowable communication bandwidth $BW0_{new}$.

Next, the determination section in the communication request reception determination unit 306 determines whether a bandwidth (bandwidth required by user data) BWU required by the communication request received in step S1 falls within the allowable communication bandwidth BW0 (including the new allowable communication bandwidth $BW0_{new}$) (step S6). If the bandwidth BWU falls within the allowable communication bandwidth BW0, the communication request is received (step S7). If the bandwidth BWU falls outside the allowable communication bandwidth BW0, the communication request is denied (step S8).

The error rate in the radio channel between the mobile terminal 100 and the radio base station 200 is hither than in a wired line. For this reason, retransmission control or an error correcting code is often used in the communication quality control units 104 and 304. In this case, a difference is generated between the bandwidth BWU required by user data and the bandwidth for actual use of the radio channel. When the communication quality Q provided to communication which requests without communication quality is high, a necessary bandwidth when retransmission control or an error correcting code is used is narrow. When the communication quality Q provided to communication which requests without communication quality is low, a necessary bandwidth when retransmission control or an error correcting code is used is wide. If the necessary bandwidth is ensured as a predetermined width in a communication bandwidth BWh of the radio channel, i.e., a predetermined allowable communication bandwidth BW0 is set, the utilization efficiency of the radio channel cannot be improved.

In this embodiment, when the communication quality Q is higher than the threshold value QH, and the necessary bandwidth when retransmission control or an error correcting code is used is probably narrow, the allowable communication bandwidth BW0 is widened by BW1. On the other hand, when the communication quality Q is lower than the threshold value QL, and the necessary bandwidth when retransmission control or an error correcting code is used is probably wide, the allowable communication bandwidth BW0 is narrowed by BW2.

If the newly set allowable communication bandwidth BW0 exceeds the communication bandwidth BWh of the radio channel, the allowable communication bandwidth BW0 is set to BWh. If the newly set allowable communication bandwidth BW0 is lower than the communication bandwidth BW1 of the radio channel, the allowable communication bandwidth BW0 is set to BW1. That is, the upper and lower limits of the allowable communication bandwidth BW0 are regulated by the communication bandwidths BWh and BW1.

Figure 4:
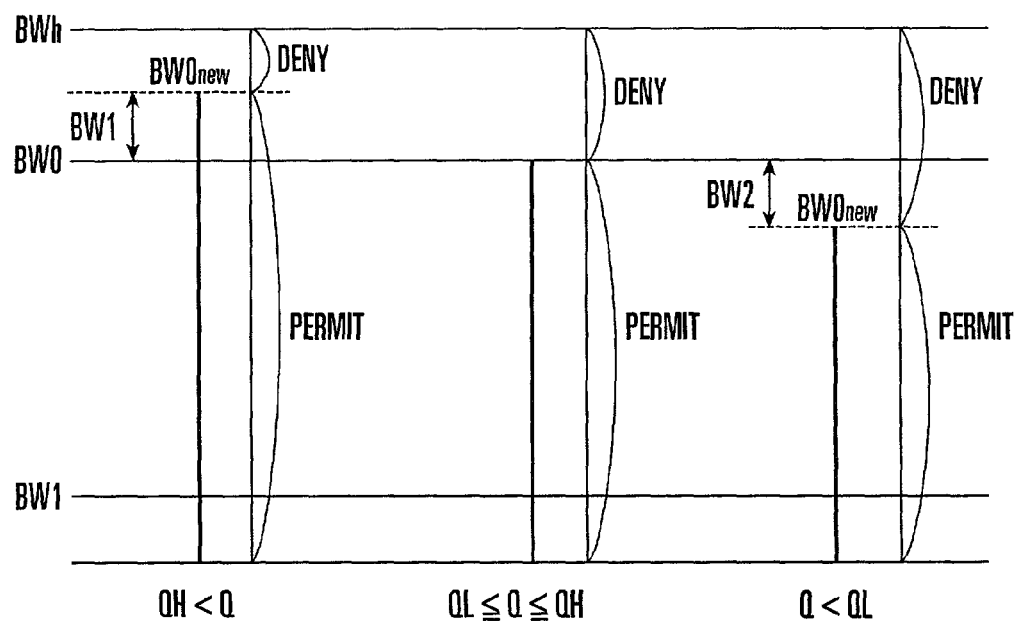
FIG. 4 is a view showing reception permission and reception denial situations when a communication request which designates a communication quality is received.

Hence, as shown in FIG. 4, when QH<Q, the allowable communication bandwidth BW0 is widened (the ensured amount of the necessary bandwidth when retransmission control or an error correcting code is used is decreased), and the bandwidth BWU of a receivable communication request becomes wide. On the other hand, when Q<QL, the allowable communication bandwidth BW0 is narrowed (the ensured amount of the necessary bandwidth when retransmission control or an error correcting code is used is increased), and the bandwidth BWU of a receivable communication request becomes narrow. With this operation, the allowable communication bandwidth BW0 changes. The communication quality for a communication request permitted to receive is guaranteed, and the utilization efficiency of the radio channel is improved.

As the communication quality, the mobile terminal 100 requests a data error rate or delay time of the radio network controller 300.

As has been described above, according to the present invention, in the radio network controller, when a communication request which designates the communication quality is received, it is determined whether the received communication request is to be received in accordance with the value of the communication quality provided to communication which requests without communication quality. If the communication quality is high, the allowable communication bandwidth is widened. If the communication quality is low, the allowable communication bandwidth is narrowed. With this processing, the utilization efficiency of a radio channel can be improved while ensuring the necessary bandwidth when retransmission control or an error correcting code is used.

What is claimed is:

1. A mobile communication system comprising:
   a mobile terminal capable of designating a communication quality in requesting communication;
   a radio base station connected to said mobile terminal through a radio channel; and
   a radio network controller connected to said radio base station to control the communication quality between said mobile terminal and said radio base station,
   wherein said radio network controller comprises a communication request reception determination unit for, upon receiving a communication request which designates the communication quality from said mobile terminal, determining whether the received communication request is to be received, on the basis of a communication quality provided to communication which requests without communication quality, wherein:

said communication quality is based on an error rate in said radio channel between said mobile terminal and said radio base station, said radio network controller further comprises a communication quality measurement unit for measuring a communication quality Q provided to communication which requests without communication quality, and said communication request reception determination unit comprises:

comparison means for, upon receiving the communication request which designates the communication quality, comparing the measured communication quality Q output from said communication quality measurement unit with a predetermined threshold value, bandwidth setting means for re-setting an allowable communication bandwidth on the basis of a comparison result from said comparison means, and determination means for determining whether the communication request is to be received, on the basis of a bandwidth required by the received communication request and the allowable communication bandwidth re-set by said bandwidth setting means, wherein:

when the measured communication quality Q is higher than a first threshold value QH, said bandwidth setting means increases the allowable communication bandwidth by a first predetermined value to re-set a new allowable communication bandwidth, and when the measured communication quality Q is lower than a second threshold value QL (QL<QH), said bandwidth setting means decreases the allowable communication bandwidth by a second predetermined value to re-set a new allowable communication bandwidth, and when the bandwidth required by the received communication request falls within the re-set allowable communication bandwidth, said determination means permits to receive the communication request, and when the bandwidth required by the received communication request falls outside the re-set allowable communication bandwidth, said determination means denies to receive the communication request.

2. A system according to claim 1, wherein said communication request reception determination unit further comprises inquiry means for, upon receiving the communication request which designates the communication quality, inquiring of said communication quality measurement unit of the communication quality Q provided to communication which requests without communication quality, and said communication quality measurement unit measures the communication quality Q and outputs the communication quality to said communication request reception determination unit in response to the inquiry from said inquiry means.

3. A mobile communication system comprising:

a mobile terminal capable of designating a communication quality in requesting communication;

a radio base station connected to said mobile terminal through a radio channel; and a radio network controller connected to said radio base station to control the communication quality between said mobile terminal and said radio base station, wherein said radio network controller comprises a communication request reception determination unit for, upon receiving a communication request which designates the communication quality from said mobile terminal, determining whether the received communication request is to be received, on the basis of a communication quality provided to communication which requests without communication quality, wherein, said radio network controller further comprises a communication quality measurement unit for measuring a communication quality Q provided to communication which requests without communication quality, and said communication request reception determination unit comprises comparison means for, upon receiving the communication request which designates the communication quality, comparing the measured communication quality Q output from said communication quality measurement unit with a predetermined threshold value, bandwidth setting means for re-setting an allowable communication bandwidth on the basis of a comparison result from said comparison means, determination means for determining whether the communication request is to be received, on the basis of a bandwidth required by the received communication request and the allowable communication bandwidth re-set by said bandwidth setting means wherein, when the measured communication quality Q is higher than a first threshold value QH, said bandwidth setting means increases the allowable communication bandwidth by a first predetermined value to re-set a new allowable communication bandwidth, and when the measured communication quality Q is lower than a second threshold value QL (QL<QH), said bandwidth setting means decreases the allowable communication bandwidth by a second predetermined value to re-set a new allowable communication bandwidth, and when the bandwidth required by the received communication request falls within the re-set allowable communication bandwidth, said determination means permits to receive the communication request, and when the bandwidth required by the received communication request falls outside the re-set allowable communication bandwidth, said determination means denies to receive the communication request.

4. A system according to claim 3, wherein when the measured communication quality Q has a value between the first threshold value QH and the second threshold value QL, said bandwidth setting means maintains the current allowable communication bandwidth.

5. A system according to claim 3, wherein when the newly set allowable communication bandwidth exceeds a communication bandwidth of the radio channel, the allowable communication bandwidth is set to the communication bandwidth of the radio channel, and when the newly set allowable communication bandwidth is lower than a first predetermined value, the allowable communication bandwidth is set to the first predetermined value.

* * * * *